United States Patent [19]

Suzuki

[11] Patent Number: 4,930,080

[45] Date of Patent: May 29, 1990

[54] CONTROL ARRANGEMENT FOR AUTOMATIC TRANSMISSION

[75] Inventor: Yutaka Suzuki, Hatano, Japan

[73] Assignee: Nissan Motor Co., Ltd., Yokohama, Japan

[21] Appl. No.: 192,973

[22] Filed: May 12, 1988

[30] Foreign Application Priority Data

May 15, 1987 [JP] Japan .................. 62-72644

[51] Int. Cl.⁵ .............................. B60K 41/06
[52] U.S. Cl. .................. 364/424.1; 74/867; 192/0.052; 192/109 F
[58] Field of Search ......... 364/424.1; 74/867; 192/109 F, 0.052

[56] References Cited

U.S. PATENT DOCUMENTS

| 4,501,173 | 2/1985 | Honig | 74/867 |
|---|---|---|---|
| 4,532,829 | 8/1985 | Sugano | 74/867 |
| 4,665,776 | 5/1987 | Sugano | 74/867 |
| 4,667,540 | 5/1987 | Yagi | 74/867 |
| 4,688,451 | 8/1987 | Sakai et al. | 74/867 |
| 4,713,989 | 12/1987 | Hayakawa et al. | 74/867 |
| 4,722,251 | 2/1988 | Sumiya et al. | 74/867 |
| 4,729,265 | 3/1988 | Sugano | 74/867 |
| 4,730,521 | 3/1988 | Hayasaki et al. | 74/867 |
| 4,748,870 | 6/1988 | Sugino et al. | 74/867 |
| 4,775,938 | 10/1988 | Hiramatsu | 74/867 |
| 4,787,272 | 11/1988 | Taga et al. | 74/867 |
| 4,807,496 | 2/1989 | Hayasaki et al. | 74/867 |

Primary Examiner—Parshotam S. Lall
Assistant Examiner—Christopher L. Makay
Attorney, Agent, or Firm—Foley & Lardner, Schwartz, Jeffery, Schwaab, Mack, Blumenthal & Evans

[57] ABSTRACT

In a fluid controlled automatic transmission for a motor vehicle, a fixed orifice which restricts communication between a low clutch source of line pressure and a friction element which is engaged in forward speeds, is by-passed for a predetermined period following a neutral-to-drive select to allow the friction element to rapidly engage while attenuating selection shock.

8 Claims, 3 Drawing Sheets

CONTROL ARRANGEMENT FOR AUTOMATIC TRANSMISSION

BACKGROUND OF THE INVENTION

1. Field of the Invention

The present invention relates generally to an automatic transmission suited for use in an automotive vehicle and more specifically to such a type of transmission wherein N - D select shock is attenuated.

2. Description of the Prior Art

A four foward speed type automotive automatic transmission of the type disclosed in NISSAN AUTOMATIC TRANSMISSION SERVICE MANUAL published in Feb. 1984, includes a low clutch and a fixed one-way orifice arrangement which is fluidly interposed between a source of line pressure and the servo chamber of the clutch. This one-way orifice is arranged to restrict the flow of hydraulic fluid to the clutch and allow the fluid to drain rapidly therefrom.

The system further includes an accumulator which is operatively connected with the clutch in a manner to modify the rate at which hydraulic pressure develops in the clutch servo chamber and smooth the engagement characteristics of the clutch during shifting.

When this type of transmission is shifted from neutral (N) to drive (D) range, a notable N-D select shock tends to be produced. To overcome this it is possible to reduce the size of the fixed orifice and increase the flow resistance provided thereby. However, this causes the charging time of the accumulator to become excessively long and leads to an unacceptably increased N-D time lag.

SUMMARY OF THE INVENTION

It is an object of the present invention to provide a simple arrangement wherein the rate at which hydraulic pressure can be supplied to a selected friction element which is engaged upon a N - D selection, is temporarily increased for a brief predetermined period following the selection.

In brief, the above object is achieved by an arrangement wherein a fixed orifice which restricts communication between a source of line pressure and a friction element which is engaged in forward speeds, is by-passed for a predetermined period following a N - D selection to allow the friction element to engage rapidly.

More specifically, a first aspect of the present invention takes the form of a hydraulic control system including a source of hydraulic pressure, the control system featuring: a friction element; an accumulator fluid communicating with the friction element; a first valve fluidly interposed between the source and the friction element; a selectively operable arrangement, connected with the first valve for selectively conditioning the first valve to supply hydraulic fluid to the friction element; a one-way orifice arrangement fluidly interposed between the first valve and the friction element; by-pass means for by-passing the one-way orifice, the by-pass means being responsive to the selectively operable arrangement for by-passing the one-way orifice arrangement for a predetermined period following the valve being conditioned to supply hydraulic fluid to the friction element.

A second aspect of the invention is in the form of a hydraulic control system which features a friction element, the friction element having a chamber which when supplied with hydraulic pressure, induces clutch engagement; a source of hydraulic pressure; a first valve fluidly interposed between the source and the friction element, the valve being operatively connected with a manually operable arrangement in a manner to selectively supply or cut-off the supply of hydraulic pressure to the chamber of the friction element; an accumulator, the accumulator fluidly communicating with the chamber of the friction element in a manner to supply hydraulic pressure at the same time as the chamber of the friction element is supplied with hydraulic fluid; a one-way orifice arrangement, the one-way orifice arrangement being fluidly interposed between the chamber of the friction element and the valve, the one-way orifice being arranged to restrict the supply of hydraulic fluid from the valve to the chamber of the friction element and to permit hydraulic fluid to drain unrestrictedly from the chamber of the friction element; a by-pass passage which by-passes the one-way orifice arrangement; a second valve, the second valve being disposed in the by-pass passage, the second valve having a first state wherein the by-pass passage is open and operative to by-pass the orifice and a second state wherein the by-pass passage is closed; and a device for controlling the second valve, the device being responsive to the first valve being conditioned to cut-off the supply of hydraulic fluid to the chamber of the friction element and operative to induce the second valve to assume its first position, the device being further responsive to the valve being changed from the condition wherein the supply of hydraulic fluid is cut-off to one wherein hydraulic fluid is supplied to the friction element, and operative to switch the second valve to its second position after a predetermined time has elapsed following the change.

DETAILED DESCRIPTION OF THE PREFERRED EMBODIMENT

Figure 1:
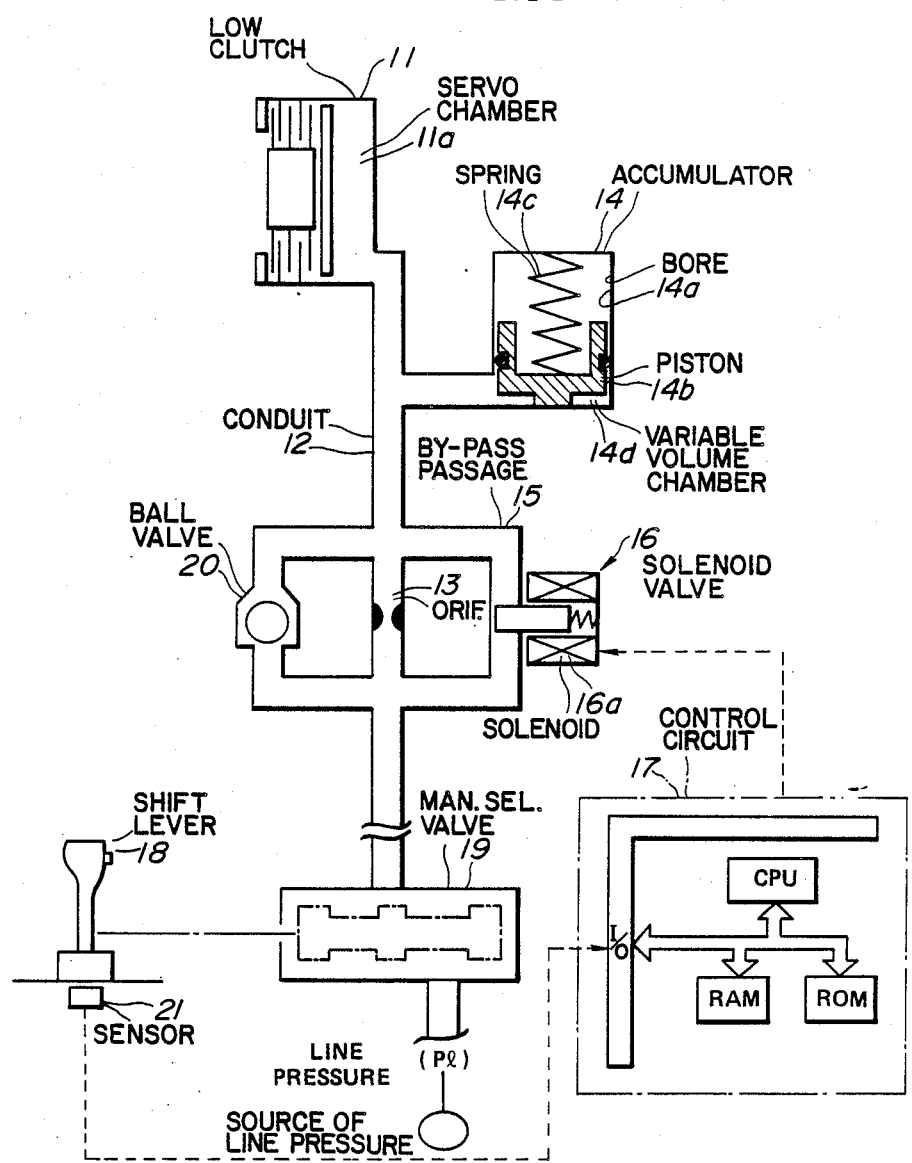
FIG. 1 is a schematic partially sectioned elevation showing an orifice arrangement which characterizes an embodiment present invention.
Figure 2:
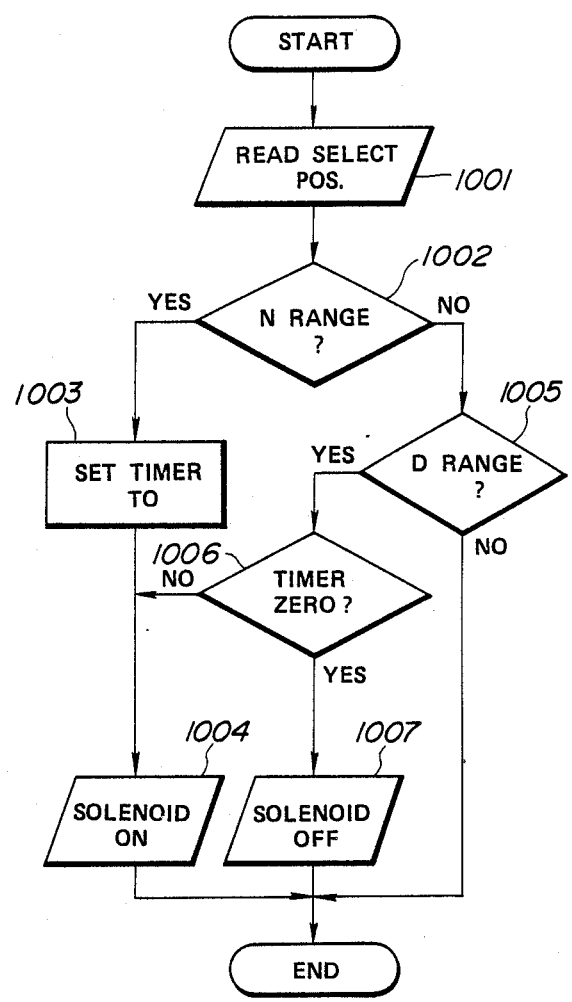
FIGS. 2 and 3 are flow charts showing the operations which characterize the control provided by the arrangement shown in FIG. 1.

FIG. 2 shows a portion of a hydraulic control system which is designed to control the operation of the above mentioned type of four speed automatic transmission. This arrangement includes a low clutch 11 which is supplied line pressure via a conduit 12. A fixed orifice 13 is disposed in conduit 12 between the clutch and a source of line pressure. An accumulator 14 is arranged to communicate with the conduit 12 at a location defined between the clutch 11 and the orifice 13.

In the illustrated arrangement, the accumulator 14, in this instance, is shown to include a bore 14a and a piston 14b reciprocatively disposed therein. A spring 14c is arranged to bias the piston 14b toward a position wherein the volume of the variable volume chamber defined in the bore by said piston, is reduced. It will be appreciated that the construction and arrangement of the accumulator is not limited to this design. The accumulator could be arranged, by way of example, in a manner to include a stepped bore and stepped piston which define two discrete variable volume chambers, one of which communicates with the conduit 12 and the other which communicates with a source of line pressure or similar pressure. In this instance a spring is provided in the chamber which communicates with the conduit 12. The cross-sectional area of the piston exposed the latter mentioned chamber is larger than that exposed to the chamber supplied with the line pressure.

A by-pass passage 15 is arranged to fluidly communicate with conduit 12 at points upstream and downstream of the orifice 13.

An ON/OFF type solenoid valve 16 is disposed in conduit 15. The valve 16 is operatively connected with a control circuit 17 which in this case includes a microprocessor. The microprocessor receives a data input from a shift lever position detection sensor 21. This device is arranged to produce first and second signals indicative of the shift lever being in the N and D range positions respectively.

A ball valve 20 is arranged in parallel with the fixed orifice 13. This device is arranged to close when hydraulic fluid is being supplied through conduit 12 toward the clutch 11 and to open when fluid is being drained from the clutch 11.

A manual selector valve 19 is disposed in the conduit 12 between the orifice 13 and the source of line pressure. This valve is operatively connected with the shift lever and is arranged to supply line pressure into the conduit 12 when the shift lever is moved into the D range position.

As will be fully appreciated, the above described arrangement is incorporated in a control system which further includes: a high clutch, a rear clutch, a low and reverse brake; 1-2, 2-3 and 3-4 shift valves; a variable capacity pump, a line pressure regulator valve, a governor valve, a throttle valve and the like, and which can be conditioned to produce first, second and third foward gear ratios in the D range, fourth in OD and to selectively produce one of first, second and third foward gear ratios by appropriately setting the shift lever 18 to the I, II, or III positions respectively.

For further information concerning the construction and operation of the system to which the instant embodiment is applied, reference can be had to U.S. Pat. No. 4,561,528 issued in the name of Sugano on Dec. 31, 1985 and U.S. Pat. No. 4,602,529 issued on July 29, 1986 also in the name of Sugano.

The operation of the above described arrangement is such that when the shift lever 18 is moved from the N position to the D one, the shift lever position detection sensor 21 detects the change in position and outputs a signal indicative of the currently selected one of the two ranges. This information is fed to the I/O of the microprocessor which in turn energizes the solenoid 16a of the solenoid valve 16 and induces the plunger or like element which closes the passage 15, to be withdrawn or moved in a manner which renders passage 15 open and therefore operative to by-pass the orifice 13.

At the same time line pressure is supplied into conduit 12 through the manual selector valve 19. Under these conditions this pressure is unrestrictedly supplied into the servo chamber 11a of the low clutch and into chamber 14c of the accumulator.

Figure 5:
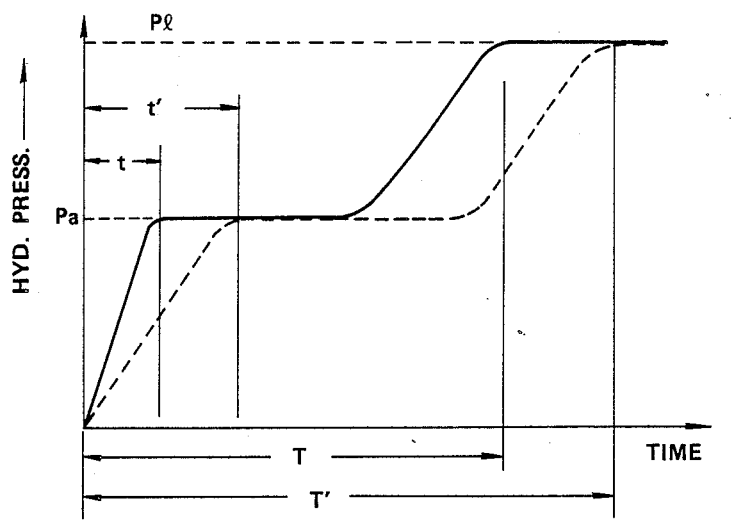
FIG. 5 is a chart which shows, in terms of hydraulic pressure and time, the improvement in clutch engagement enabled with the present invention.

The rate at which pressure develops in the chamber 11a of the forward clutch 11 is shown in FIG. 5. It will be noted that in this FIG. the characteristics shown in solid line are those produced by the instant embodiment while the solenoid is energized while those shown in chain line are those produced when the by-pass passage 15 is closed and communication between the clutch chamber 11a is provided exclusively by the fixed orifice 13.

As will be noted with the present invention by by-passing the orifice 13 it is possible to more rapidly raise the pressure in the chambers 11a and 14d to the level Pa at which the piston of the accumulator 14 begins move against the bias of the spring 14c. During the reciprocation of the piston 14b the pressure development temporarily levels off at pressure Pa until the accumulator 14 is charged. Following this, the pressure again increases to become equal to that of the line pressure.

As indicated, while the solenoid 16a is energized and the by-pass passage 15 rendered operational, the time at which the pressure reaches Pa in the clutch chamber 11a is reduced from time t' to time t; while the time required for line pressure level to be reached is reduced from time T' to time T.

FIG. 2 shows in flow chart form the operations which are performed in the CPU of the microprocessor in order to ensure the above control. As shown, the first step (1001) of the routine shown in FIG. 2 is such as to read the output of the shift lever position sensor 21 and to set this data in manner suitable for further processing. At step 1002 the data read in the previous step is screened to determine if the transmission is currently being conditioned for N range or not. In the event that this inquiry indicates that the transmission is in fact in neutral gear, the program flows to step 1003 wherein a timer To is reset to its maximum count. At step 1004 a command to energize the solenoid 16a of the solenoid valve 16 is issued and the program ends.

However, when, during a subsequent run of the program, the outcome of the inquiry conducted at step 1002 is negative, the program flows to step 1005 wherein the data recorded in step 1001 is examined in order to determine if the transmission is in D range or not. In the event that the shift lever has been moved to a position other than N and D, for example, R range, or any one of I, II and III ranges, the program ends. However, when it is indicated that D range is selected, the program goes to step 1006 wherein the instant status of the timer To is examined. If the count of timer To has not yet reduced to zero then the program goes to step 1004 to maintain the energization of solenoid 16a.

Upon timer To having counted down to zero the program flows to step 1007 wherein a command to de-energize solenoid 16a is issued.

It will be note that in this case timer To is a so called "soft" timer which is arranged to count down to zero from a predetermined number. The rate at which the timer counts down is controlled by an interrupt routine of the nature shown in FIG. 3. As will be appreciated this routine is arranged to be run at predetermined time intervals (50–100 ms by way of example only).

Each time this routine is run the count of timer To is decremented by one. On the other hand, in the event that the routine shown in FIG. 2 passes through step 1002 the value is restored to its maximum level.

Figure 4:
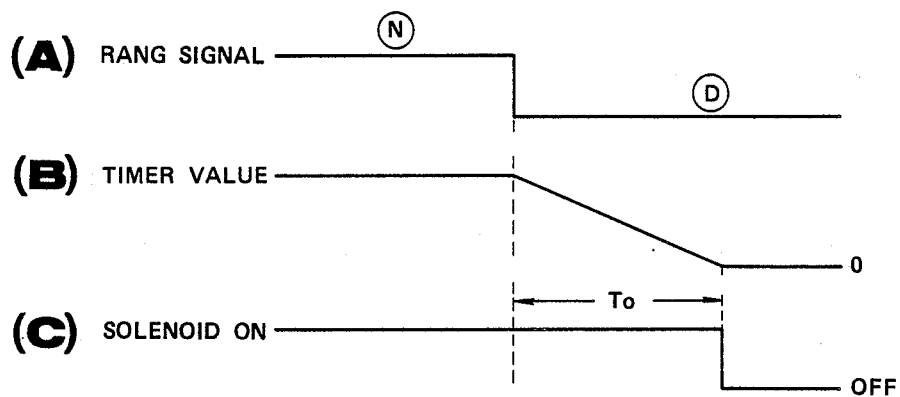
FIG. 4 is a timing chart showing the solenoid control characteristics which form a vital part of the instant embodiment.

FIG. 4 shows, in timing chart form, the control provided by the above described program. As will be appreciated, while the shift lever is set in the neutral position (N) the output of the sensor 21 assumes a first level while when moved to the D range changes to a lower one.

Figure 3:
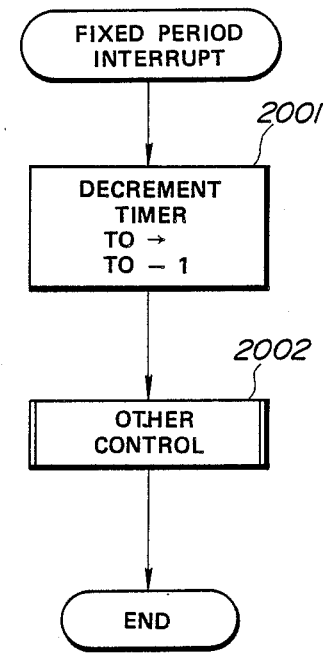

Following the change in position sensor 21 output, the timer To which is constantly being reset at step 1003 is allowed to count down under in response to the running of the routine shown in FIG. 3. Upon reaching zero the solenoid 16a which has been continuously energized while the select lever 18 was in the neutral position and during the timer countdown, is de-energized and the by-pass passage 15 closed to re establish the function of the orifice 13.

With the above described embodiment the following advantages are derived:

1. the size of the orifice 13 can be selected to provide good shift shock attenuation free of the need to give consideration to N - D select shock;

2. only a timer is necessary and attention to the amount and pressure of hydraulic fluid being transferred need not be given consideration;

3. as a simple ON/OFF type valve can be used the cost of the system is minimized and operation thereof facilitated.

It should be noted that various modifications to the above disclosed arrangement are possible without departing from the scope of the present invention. For example, although a fixed period timer To has been described, it is possible to vary the length of the period over which the timer counts down (viz., vary the value from which the counter counts down) in response to a parameter such as hydraulic fluid temperature. Viz., as is well known the engagement characteristics of transmission friction elements varies notably with temperature and as such the variation of the count down period in accordance with this parameter is deemed advantageous.

In this instance, the application of a temperature responsive valve arrangement is not limited to the low clutch and could be considered for use with other clutches and/or friction elements in the event that compensation for the drift in engagement characteristics therein is required.

It is with the scope of the present invention to provide pressure modulation by controlling the duty cycle of the signal applied to the solenoid coil, and therefore develop a variable control as different from a simple single energization.

A further modification comes in that it is possible to energize the solenoid 16a during D - N shifts in addition to N - D shifts.

In lieu of an electronically controlled by-pass control valve it is possible to arrange for a mechanical timer valve to be responsive to the N - D selection and for this valve to control the by-passing of the fixed orifice. By way of example only, when the select lever 18 is set in the neutral position a valve chamber could be pressurized via a one-way orifice arrangement similar to the charging of an accumulator and the discharge time of the chamber arranged to be such that the by-pass passage remains open until the chamber is drained.

What is claimed is:

1. In a hydraulic control system including a source of hydraulic fluid
   a friction element, said friction element having a fluid chamber, said fluid chamber being connected by conduit means with said source of hydraulic fluid;
   an accumulator, said accumulator being fluidly communicated with said fluid chamber of said friction element;
   a first valve disposed in said conduit means between said source and said fluid chamber of said friction element said first valve controlling fluid communication between said fluid chamber and said source of hydraulic fluid;
   a manually operable device, said device being operatively connected with said first valve for selectively conditioning said first valve to supply said hydraulic fluid from said source to said friction element;
   a one-way orifice disposed in said conduit means between said first valve and said fluid chamber of said friction element;
   by-pass means for by-passing said one-way orifice, said by-pass means being responsive to said selectively operable device for bypassing said one-way orifice for a predetermined period following said value being conditioned by said manually operable device to supply said hydraulic fluid to said friction element.

2. A hydraulic control system as claimed in 1 wherein said predetermined period is variable with a predetermined operational parameter of said system said predetermined period being timed by a timer which is included in said by-pass means, said timer being responsive to the magnitude of said operational parameter, said timer varying the period over which it counts in response to said magnitude of said operational parameter.

3. A hydraulic control system as claimed in claim 1 wherein:
   said one-way orifice includes a fixed orifice and a one-way valve; and
   wherein:
   said by-pass means comprises;
   a by-pass passage which leads around said fixed orifice; and
   a second valve disposed in said by-pass means, said second valve having a first state wherein said means is open and operative to by-pass said fixed orifice and a second state wherein said by-pass means is closed.

4. A hydraulic control system as claimed in claim 3 wherein
   said manually operable device comprises:
   a select lever, said select lever being operatively connected with said first valve for moving a valve element of said first valve between a first position wherein said hydraulic fluid is prevented from being supplied to said friction element, and a second position wherein said hydraulic fluid is supplied to said friction element; and
   wherein:
   said by-pass means further comprises:
   a sensor, said sensor being responsive to said manually operable device for outputting an output signal indicative of said select lever being moved in manner which induces said valve element of said first valve to be moved from said first position to said second position;
   a control circuit, said control circuit being responsive to said output signal of said sensor in a manner which issues a first control signal to said second valve which induces said second valve to assume said first state while said select lever is in a position wherein said valve element of said first valve is held in said first position and which issues a second control signal to said second valve which induces said second valve to assume said second state said predetermined time after said select lever is moved in a manner which moves said valve element of said first valve to said second position.

5. A hydraulic control system as claimed in claim 2 wherein said predetermined operational parameter comprises the temperature of said hydraulic fluid.

6. In a hydraulic control system having a chamber which when supplied with hydraulic fluid under pressure induces clutch engagement;
   a source of hydraulic fluid under pressure;
   a first valve fluidly interposed between said source and said friction element, said valve being operatively connected with a manually operable member in a manner to selectively supply said hydraulic fluid under pressure to said chamber of said friction element;
   an accumulator, said accumulator being fluidly communicated with said chamber of said friction element in a manner to be supplied with said hydraulic fluid under pressure at the same time as said chamber of said friction element is supplied with said hydraulic fluid under pressure;
   a one-way orifice, said one-way orifice being fluidly interposed between said chamber of said friction element and said valve, said one-way orifice being arranged to restrict said hydraulic fluid under pressure from said valve to said chamber of said friction element and to permit hydraulic fluid to drain unrestrictedly from said chamber of said friction element;
   a by-pass passage which by-passes said one-way orifice;
   a second valve, said second valve being disposed in said by-pass passage, said second valve having a first state wherein said by-pass passage is open and operative to by-pass said orifice and a second state wherein said by-pass passage is closed; and
   a device for controlling said second valve, said device being responsive to said first valve being conditioned to cut-off supply of hydraulic fluid to said chamber of said friction element and operative to induce said second valve to assume said first state, said device being further responsive to said first valve being changed from the condition wherein supply of hydraulic fluid is cut-off to one wherein hydraulic fluid is permitted to be supplied to said friction element, and operative to switch said second valve to said second state after a predetermined time has elapsed following the change.

7. A hydraulic control system as claimed in claim 1 wherein said by-pass means includes a timer, said timer being arranged to determine said predetermined period.

8. In a hydraulic control system
   a source of hydraulic fluid under pressure;
   a friction element, said friction element having a fluid chamber, said fluid chamber being so constructed that when hydraulic fluid of sufficient pressure is supplied thereinto, said friction element becomes engaged;
   a conduit leading from said source to said fluid chamber;
   a selector valve disposed in said conduit between said source and said chamber, said selector valve being connected to a manually operable member, said manually operable member being movable to a predetermined position wherein said selector valve is conditioned to permit hydraulic fluid under pressure from said source to be transmitted from said source to said fluid chamber;
   a one-way orifice disposed in said conduit between said manually operable member and said chamber;
   an accumulator, said accumulator having a chamber which communicates with said conduit between said fluid chamber and said one-way orifice;
   a by-pass passage which leads around said one-way orifice;
   a by-pass control valve disposed in said by-pass passage, said by-pass control valve having a first position wherein said by-pass passage is open and a second position wherein said by-pass passage is closed;
   a sensor for sensing said manually operable member being moved into said predetermined position; and
   a control circuit, said control circuit controlling the operation of said by-pass control valve, said control circuit being responsive to said sensor and arranged to move said by-pass control valve to said first position for a predetermined period of time following said sensor detecting said manually operable member being moved to said predetermined position.

* * * * *